(12) United States Patent
Simonds

(10) Patent No.: US 6,350,114 B1
(45) Date of Patent: Feb. 26, 2002

(54) ISOTHERMAL CORE MOLDING PLATEN

(75) Inventor: Vincent J. Simonds, Brimfield, MA (US)

(73) Assignee: Spalding Sports Worldwide, Inc., Chicopee, MA (US)

( * ) Notice: Subject to any disclaimer, the term of this patent is extended or adjusted under 35 U.S.C. 154(b) by 0 days.

(21) Appl. No.: 09/514,766

(22) Filed: Feb. 28, 2000

(51) Int. Cl.[7] ................................................ B29C 43/52
(52) U.S. Cl. .......................... 425/234; 249/78; 249/79; 249/81; 425/407; 425/408
(58) Field of Search ........................... 249/81, 79, 78, 249/111; 425/234, 407, 408, 547

(56) References Cited

U.S. PATENT DOCUMENTS

| | | | |
|---|---|---|---|
| 3,596,317 A | * | 8/1971 | Nicholson .................... 425/407 |
| 3,804,362 A | * | 4/1974 | Stromblad et al. ............. 249/78 |
| 4,003,687 A | * | 1/1977 | Hedin .......................... 249/79 |
| 4,338,068 A | * | 7/1982 | Suh et al. ...................... 249/79 |
| 4,500,279 A | * | 2/1985 | Devellian et al. ............. 249/81 |
| 5,176,839 A | | 1/1993 | Kim |
| 5,297,480 A | * | 3/1994 | Miyashita et al. ........... 425/407 |
| 5,535,980 A | | 7/1996 | Baumgartner et al. |
| 5,603,871 A | * | 2/1997 | Koseko et al. ............... 425/407 |
| 5,702,735 A | | 12/1997 | Martin et al. |
| 5,746,966 A | | 5/1998 | McDonald |
| 5,759,456 A | * | 6/1998 | Watanabe et al. ........... 425/547 |
| 5,827,548 A | | 10/1998 | Lavallee et al. |

FOREIGN PATENT DOCUMENTS

| | | | | |
|---|---|---|---|---|
| JP | 8-34022 | * | 2/1996 | .................. 249/79 |

* cited by examiner

Primary Examiner—Robert Davis

(57) ABSTRACT

An isothermal golf ball core molding platen is characterized by the use of isobars for even temperature distribution across the surfaces of the platen. The platen is formed of metal and includes first channels which receive heating elements for heating the platens. Isobars are arranged in second channels adjacent to the first channels. The isobars include an outer sheath defining an evacuated chamber and an inner metallic wick. The isobar is charged with working fluid which changes phase with the application of heat. The phase change provides higher speed heat transfer to eliminate temperature gradients within the platen.

13 Claims, 3 Drawing Sheets

FIG. 4
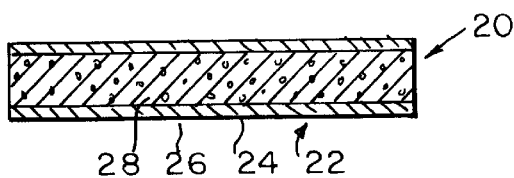
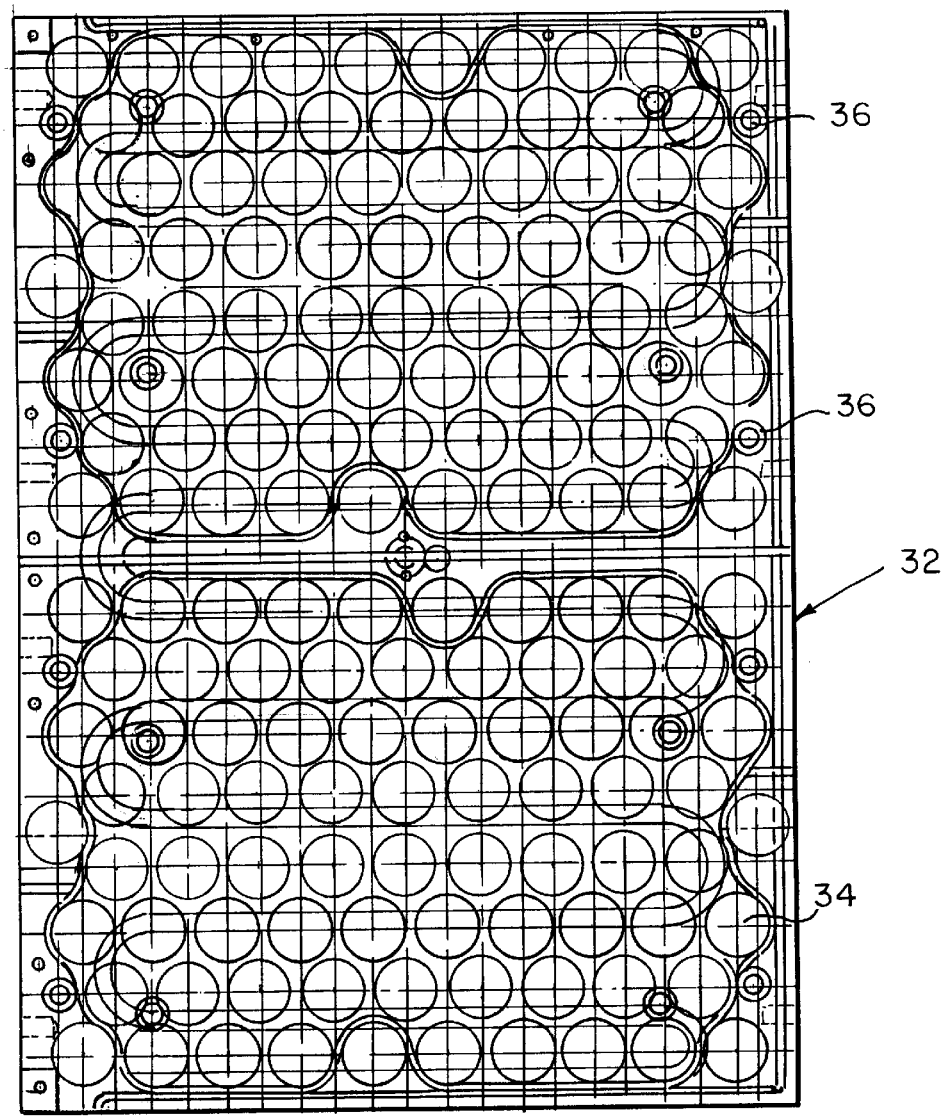
FIG. 5
FIG. 6
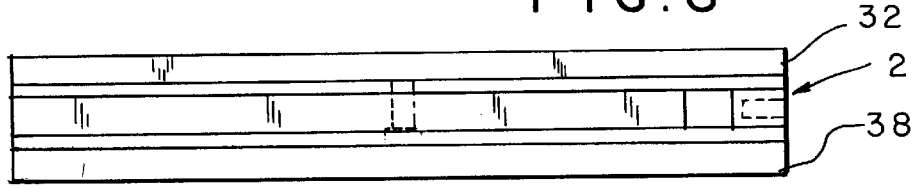

ISOTHERMAL CORE MOLDING PLATEN

BACKGROUND OF INVENTION

Most golf balls comprise a center or core surrounded by one or two layers, either a cover or a mantle and a cover. The core may be formed of a liquid or of a solid polymeric material such as polybutadiene elastomers mixed with acrylate or methacylate metal salts and the mantle and cover layers are formed of an ionomer resin. The present invention relates to an improved isothermal molding platen for manufacturing and curing solid golf ball cores.

BRIEF DESCRIPTION OF THE PRIOR ART

It is known in the art to manufacture solid golf ball cores or centers using a heated mold assembly. Plugs of core material are arranged in recesses of one of a pair of mold plates. The plates are brought together to define spherical cavities within which a plug is arranged. Heated platens at the rear of the mold plates heat the molds to cure the plugs under pressure, thereby to form solid spherical cores.

While the prior mold assemblies operate satisfactorily, the heated platens suffer from uneven heat distribution, particularly at the perimeter thereof. Thus golf ball cores formed at the edges of the mold plates take longer to cure than those toward the center. This results in uneven curing of the centers within the mold plates or an increase in the mold cycle times to allow for adequate curing of all of the cores.

The present invention was developed in order to overcome these and other drawbacks of the prior golf ball core mold devices by providing an improved heating platen with uniform temperature distribution across its surface.

SUMMARY OF THE INVENTION

Accordingly, it is a primary object of the present invention to provide a device for heating a mold used to manufacture and cure golf ball centers including a platen having planar top and bottom surfaces and a generally rectangular vertical cross-sectional configuration, the platen containing at least one first channel and at least one second channel therein. A heater, which may comprise steam or an electric element, is arranged within the first channel for heating the top and bottom platen surfaces. Isobars are arranged in the second channel for balancing the distribution of heat across the top and bottom surfaces. Accordingly, temperature gradients within the platen surfaces are eliminated.

According to a more specific embodiment of the invention, the heating platen is connected with upper and lower support plates each containing a plurality of hemispherical cavities in opposed surfaces thereof, the upper and lower hemispherical cavities being adapted to mate to define a plurality of spherical cavities when the plates are brought together. Plugs of core material arranged in the spherical cavities are cured by the heat from the isothermal platens. Because of the even temperature distribution of the platens, the plugs are all cured at the same rate.

According to a further embodiment of the invention, the isobars include an outer sheath and an inner metallic wick defining an evacuated chamber. The isobars are charged with a working fluid, such as water, which changes phase with the application of heat.

BRIEF DESCRIPTION OF THE FIGURES

Other objects and advantages of the invention will become apparent from a study of the following specification when viewed in the light of the accompanying drawing, in which:

FIG. 4 is a sectional view of an isobar used in the platen of FIG. 1;

FIG. 5 is a top plan view of one of the mold support plates according to the invention;

FIG. 6 is a front view of a molding platen having support plates mounted on the top and bottom thereof.

DETAILED DESCRIPTION

Figure 2:
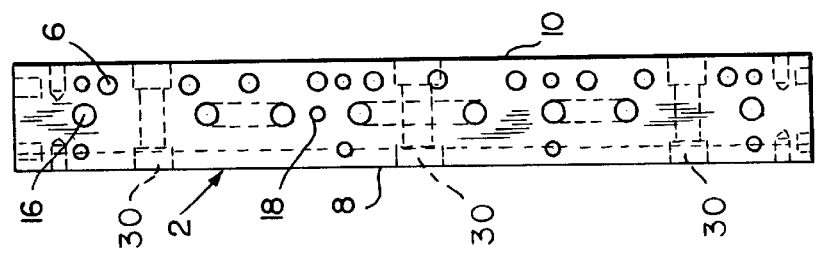
FIG. 2 is a sectional view of the platen taken along line 2—2 of FIG. 1.
Figure 1:
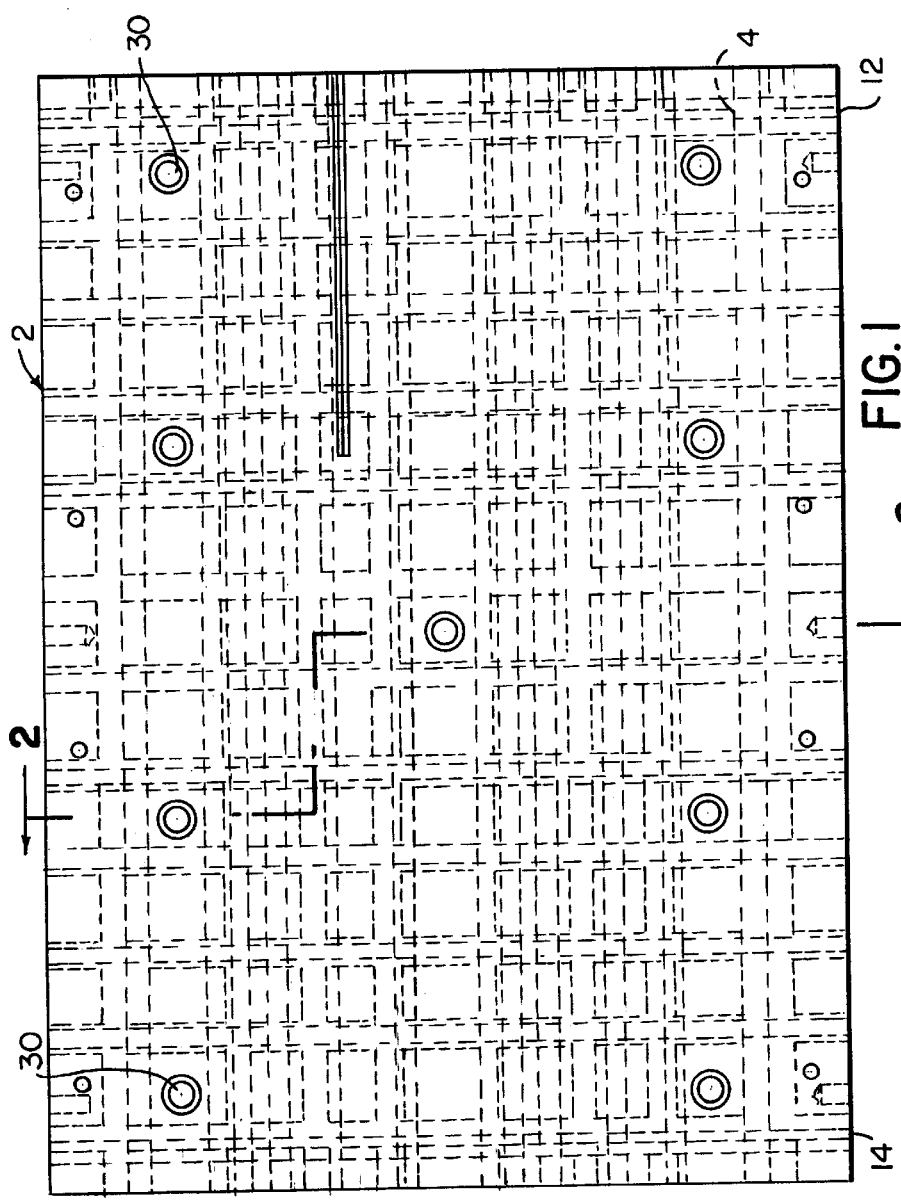
FIG. 1 is a top plan view of the golf ball core molding platen according to the invention.
Figure 3:
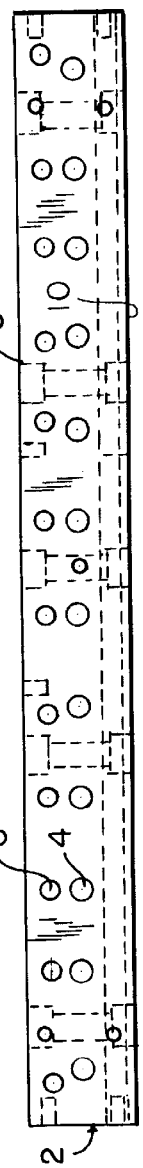
FIG. 3 is a front plan view of the platen of FIG. 1.

Referring first to FIGS. 1–3, the isothermal molding platen 2 according to the invention will be described. The platen 2 is formed of a rigid metal such as steel or aluminum and has a generally rectangular vertical cross-sectional configuration. The platen is also preferably rectangular as shown in FIG. 1, but other shapes such as square or circular may also be used. The platen 2 contains two series of channels throughout the interior thereof. The first channels 4 contain a heater element and the second channels 6 contain isobars. Preferably, the first channels 4 are arranged in a serpentine pattern within the platen to heat the top 8 and bottom 10 surfaces thereof. The first channels 4 extend adjacent to the perimeter of the platen to distribute heat across the entire top and bottom surfaces. The second channels 6 preferably extend parallel to the elongated linear portions of the first channel.

Any suitable heating element can be provided in the first channels. One such heating element is steam, although other heated fluids may be used as well. Accordingly, as shown in FIG. 1, the platen includes a steam inlet 12 and a steam outlet 14 which communicate with the first channels 4 therein. Another suitable heating element is an electric heater 16 comprising a heater filament or element arranged in the first channels as shown in FIG. 2. One or more thermocouples 18 are also provided to detect the temperature of the platen.

In order to assist with even heat distribution across the platen surfaces 8, 10 and to eliminate temperature gradients therein, isobars are provided in the second channels 6. An isobar is a high speed heat transfer device which is used in various heating and cooling applications. They are available in a wide variety of sizes and diameters and generally operate between 0° C. and 250° C.

A suitable isobar 20 such as one manufactured by Acrolab of Windsor, Ontario, Canada is shown in FIG. 4. It includes an outer sheath 22, preferably formed of copper and defining an evacuated chamber, within which is arranged a metallic wick structure 24. The isobar is charged with a working fluid, preferably water, although other fluids may be used as well. The working fluid is arranged within the wick structure. Because the evacuated chamber is at a lower pressure, the application of heat causes the fluid 26 at that location to vaporize 28 or change phase as calories are absorbed. Vapor at this location dissociates through the evacuated space in the isobar due to positive pressure generated by the vapor. As a result, the vapor contacts surfaces within the isobar that are cooler than the vaporization location. At these locations the vapor condenses distributing calories thereof to the new location. The wick then returns the charge fluid to the vaporization site.

The high speed heat transfer of the isobars serves to balance the heat distribution across the surfaces of the platens to eliminate temperature gradients. Thus, the platens have a consistent temperature for more uniform curing of golf ball cores as will now be described.

The isothermal molding platen contains a plurality of through-bores 30 which are used for connecting mold support plates therewith. One such support plate 32 is shown in FIG. 4. This plate 32 is the lower of a pair of upper and lower mold support plates. The pair of plates contain a plurality of hemispherical cavities 34 in opposed surfaces thereof. The upper and lower hemispherical cavities are adapted to mate to define spherical cavities when the plates are brought together. The plate 32 also contains a plurality of through-bores 36 for receiving bolts or other securing devices (not shown) for connecting the plate 32 with the platen 2. The plate 32 shown in FIG. 5 is connected with the upper surface of a platen 2 as shown in FIG. 6. Connected with the lower surface of the platen 2 is an upper mold support plate 38. Thus, each platen can heat the upper mold plate of a first pair of mold plates and the lower mold plate of a second pair of mold plates arranged in stacked relation in a molding assembly.

Figure 7:
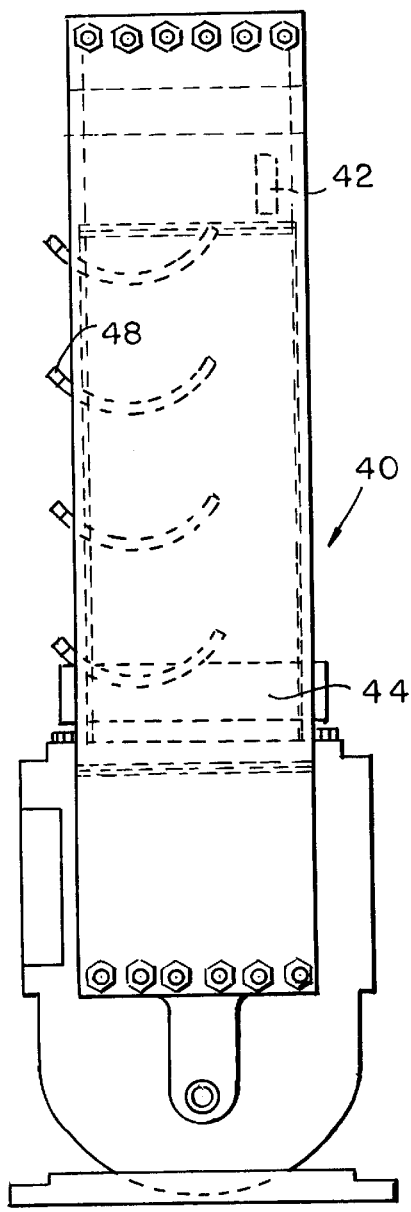
FIGS. 7 and 8 are side and front views, respectively, of a mold press assembly for simultaneously manufacturing a plurality of golf ball cores.
Figure 8:
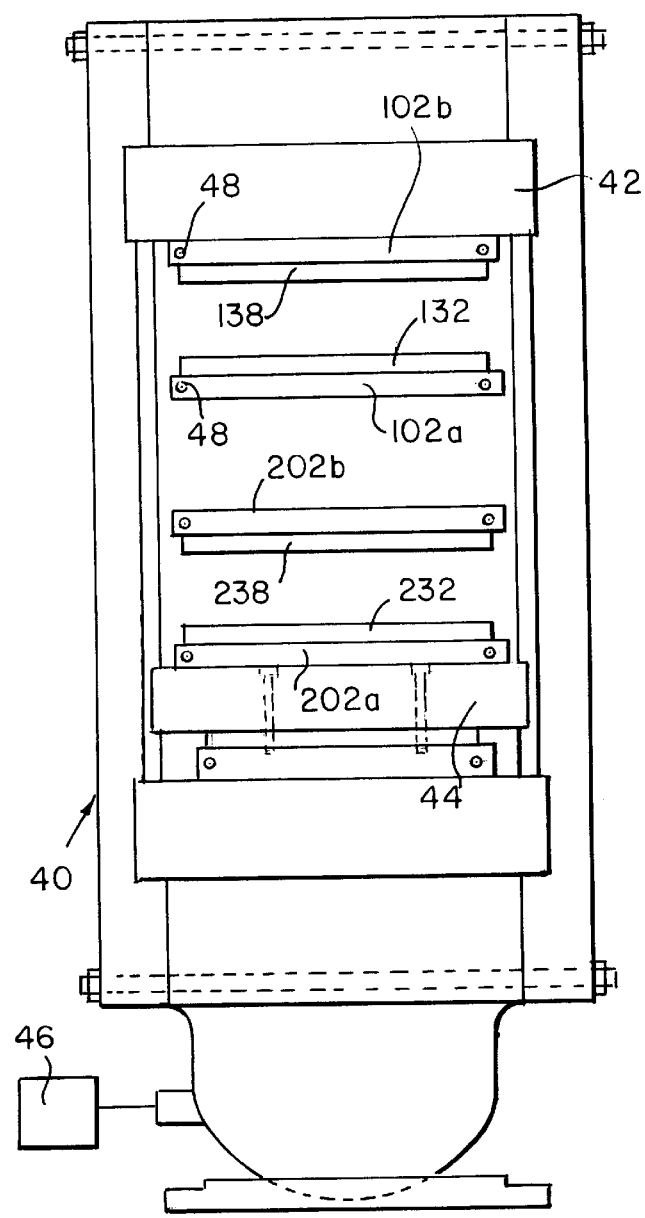

A mold assembly 40 including a plurality of stacked pairs of mold plates is shown in FIGS. 7 and 8. In the embodiment shown, an upper mold assembly includes a lower platen 102a having a lower mold plate 132 connected with the upper surface thereof. This combination is fixed to the press. An upper platen 102b has an upper mold plate 138 connected with the lower surface thereof. The platen 102b and plate 138 are connected with a moving press 42 which is lowered against the platen 102a and plate 132 to form a first plurality of golf ball cores from plugs of polymeric core material arranged in the hemispherical cavities of the lower plate 132. Suitable core material comprise polybutadiene elastomers mixed with acrylate or methacylate metal salts. A lower mold assembly includes a fixed upper platen 202b having an upper mold support plate 238 connected therewith and a movable lower platen 202a having a lower support plate 232 connected therewith, the lower platen being connected with a moving press 44. The presses 42, 44 are hydraulically operated under control of a timer (not shown) through curing cycles to form the golf ball cores. Because of the even heat distribution across the isothermal platens, the cores at the perimeter of the mold plates are cured evenly with the cores toward the center of the plates. The consistent curing of the cores means that the mold cycles can be shortened, increasing the efficiency of the molding assembly.

A diaphragm valve 46 controls the steam pressure supplied to the platens for heating the same. Steam ports 48 are located toward the rear of the press for releasing steam as necessary during the mold cycles.

While in accordance with the provisions of the patent statutes the preferred forms and embodiments of the invention have been illustrated and described, it will be apparent from those of ordinary skill in the art that various changes and modifications may be made without deviating from the inventive concepts set forth above.

What is claimed is:

1. Apparatus for heating a mold used to manufacture and cure golf ball centers, comprising
    (a) a platen having planar top and bottom surfaces and having a generally rectangular vertical cross-sectional configuration, said platen containing at least one first channel and at least one second channel traversing the interior thereof;
    (b) a heater arranged within said first channel for heating said top and bottom surfaces; and
    (c) isobars arranged within said second channels for balancing the distribution of heat across said top and bottom surfaces, whereby temperature gradients within said platen surfaces are eliminated.

2. Apparatus as defined in claim 1, wherein said isobars comprise an outer sheath and an inner metallic wick defining an evacuated chamber, said isobars being charged with a working fluid which changes phase with the application of heat.

3. Apparatus as defined in claim 2, wherein said heater comprises steam.

4. Apparatus as defined in claim 2, wherein said heater comprises an electric element.

5. Apparatus as defined in claim 2, wherein said first channels are arranged in a serpentine pattern within said platen and said second channels are arranged in parallel with linear portions of said first channels.

6. A mold assembly for manufacturing and curing golf ball centers, comprising
    (a) upper and lower support plates each containing at least one hemispherical cavity in opposed surfaces thereof, said upper and lower hemispherical cavities being adapted to mate to define at least one spherical cavity when said plates are brought together;
    (b) heating platens connected with said upper and lower support plates opposite said surfaces containing said cavities, said platens each containing at least one first channel and at least one second channel traversing the interior thereof;
    (c) a heater arranged within said first channel for heating said top and bottom surfaces; and
    (d) isobars arranged within said second channels for balancing the distribution of heat across said top and bottom surfaces, whereby temperature gradients within said platen surfaces are eliminated and uniform heat is applied to the upper and lower support plates to evenly cure golf ball centers arranged in said spherical cavity.

7. A mold assembly as defined in claim 6, wherein said support plates contain a plurality of hemispherical cavities, respectively, which mate to define a plurality of spherical cavities for simultaneously curing a plurality of golf ball centers.

8. A mold assembly as defined in claim 7, wherein said isobars comprise an outer sheath and an inner metallic wick defining an evacuated chamber, said isobars being charged with a working fluid which changes phase with the application of heat.

9. A mold assembly as defined in claim 8, wherein said heater comprises steam.

10. A mold assembly as defined in claim 8, wherein said heater comprises an electric element.

11. A mold assembly as defined in claim 8, wherein said first channels are arranged in a serpentine pattern within said platen and said second channels are arranged in parallel with linear portions of said first channels.

12. A mold assembly as defined in claim 8, wherein a plurality of pairs of upper and lower support plates are arranged in a stacked relation.

13. A mold assembly as defined in claim 12, wherein intermediate support plates between an uppermost and lower most support plate are connected with upper and lower surfaces of said heating platens.

* * * * *